United States Patent [19]
Maier

[11] 3,728,470
[45] Apr. 17, 1973

[54] ELECTRICAL OUTLET BOX WITH CABLE CONNECTORS

[76] Inventor: William Maier, 125 Lawlor Terrace, Stratford, Conn. 06497

[22] Filed: Sept. 27, 1971

[21] Appl. No.: 183,840

[52] U.S. Cl...................174/58, 174/53, 174/65 R, 220/3.92, 285/128, 285/209
[51] Int. Cl. ................................................H02g 3/16
[58] Field of Search..........................174/65, 53, 58; 220/3.2, 3.3, 3.4, 3.5, 3.6, 3.8, 3.9, 3.92, 3.94, 4; 248/DIG. 6; 285/128, 158, 209, 210, 401

[56] References Cited

UNITED STATES PATENTS

| | | | |
|---|---|---|---|
| 2,657,251 | 10/1953 | Bergan | 174/65 R |
| 1,131,399 | 3/1915 | McGinley | 174/65 R UX |
| 2,193,466 | 3/1940 | Raymond | 285/158 X |
| 1,133,946 | 3/1915 | Farrell | 220/3.92 X |
| 3,324,227 | 6/1967 | Maier | 174/58 X |
| 982,535 | 1/1911 | Rudkiewicz | 174/65 R UX |
| 2,425,545 | 8/1947 | Lefebre | 220/3.2 X |

*Primary Examiner*—Bernard A. Gilheany
*Assistant Examiner*—D. A. Tone
*Attorney*—Munson H. Lane

[57] ABSTRACT

An extruded box body with open ends has a bottom wall and a pair of side walls, with opposing channels formed at the inside of the side walls. A pair of separate box ends are provided with keeper members which are received and frictionally held in the channels. One of the side walls has an external mounting flange for securing the box to a supporting stud, and a keeper rib on the bottom wall of the box body is supportably engaged by a special fastener driven into the side of the stud. The box ends have knock-out plugs which when removed, leave openings to receive cable connectors. The openings have diametrically opposed recesses and the connectors have lugs which pass through the recesses and then hold the connectors in place when the latter are turned through 90°.

18 Claims, 11 Drawing Figures

PATENTED APR 17 1973

INVENTOR
WILLIAM MAIER

BY Munson H. Lane

ATTORNEY

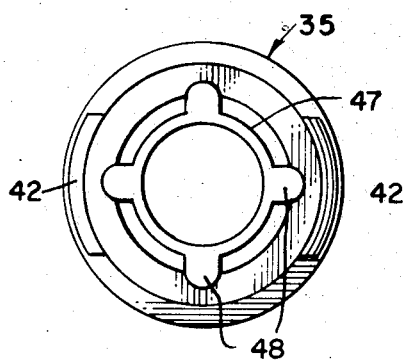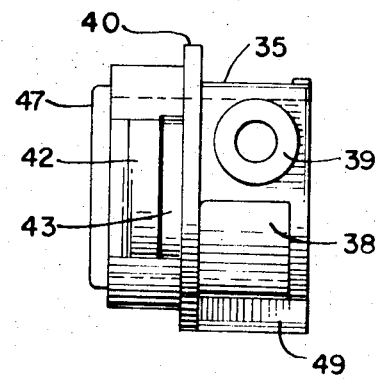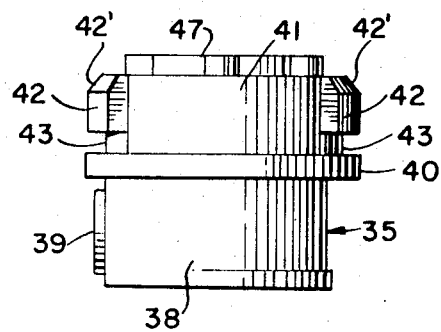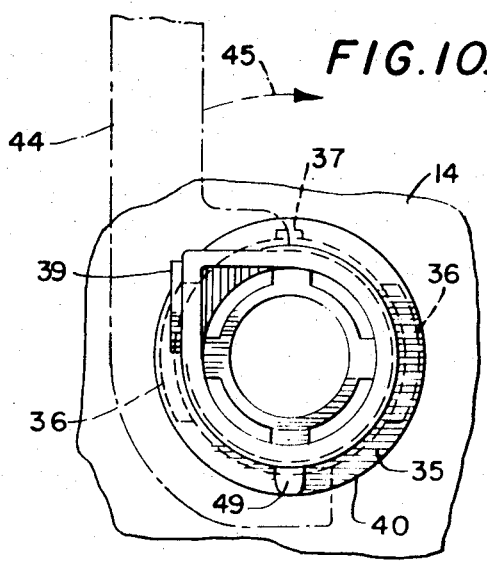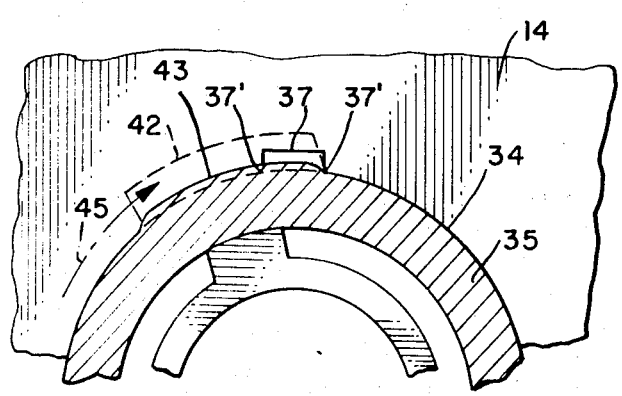

ELECTRICAL OUTLET BOX WITH CABLE CONNECTORS

This invention relates to new and useful improvements in electrical outlet boxes such as are used with switches, outlet receptacles, and the like, and the principal object of the invention is to provide an improved outlet box having an open-ended extruded box body with separate box ends which may be quickly and easily assembled on the box body and firmly held in place.

Another important object of the invention is to provide an improved outlet box including an extruded box body equipped with integral ribs for mounting the box on a supporting stud and firmly holding the box is place by means of a special fastener which is driven into the side of the stud and supportably engages one of the ribs.

Still another important object of the invention is to provide an improved outlet box having box ends equipped with knock-out plugs which, when removed, leave irregularly shaped openings for reception of cable connectors, the latter being equipped with lugs and raised portions arranged so that the connectors may be quickly applied to the box and firmly held in place by simply rotating them through 90° in the openings.

The improved outlet box and connectors of the invention are simple in construction, easily assembled, firmly fastened together, and lend themselves to economical manufacture.

With the foregoing more important objects and features in view and such other objects and features which may become apparent as this specification proceeds, the invention will be understood from the following description taken in conjunction with the accompanying drawings, in which like characters of reference designate like parts, and in which:

FIG. 7 is an end view of one of the cable connectors;

FIG. 8 is a side elevational view of the connector;

FIG. 9 is a plan view of the connector;

FIG. 10 is a fragmentary elevational view showing the connector being applied to the box end; and FIG. 11 is an enlarged, fragmentary view, partly in section, showing the wedging action of the connector in the box end opening.

Figure 1:
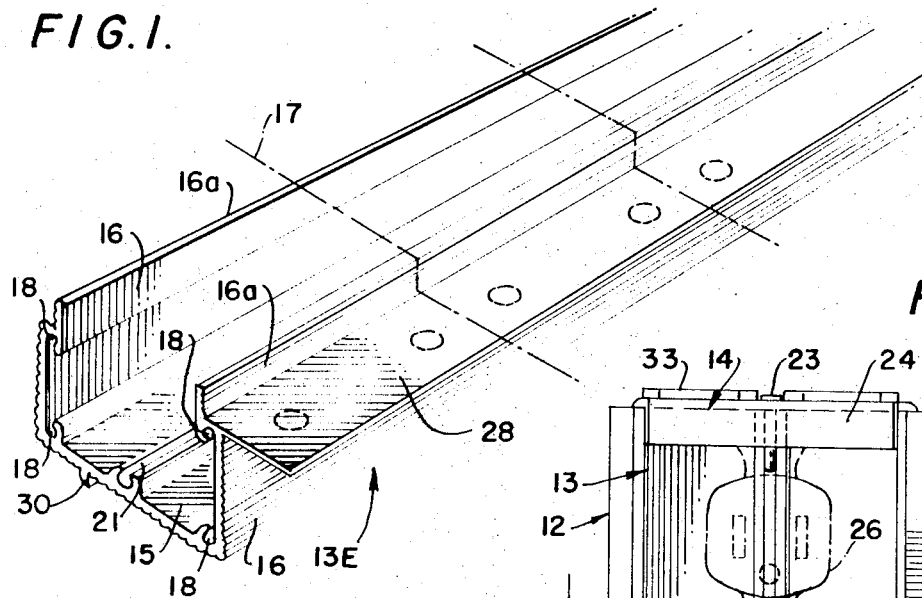
FIG. 1 is a perspective view showing a running length of an extrusion from which the body of the box is cut.
Figure 2:
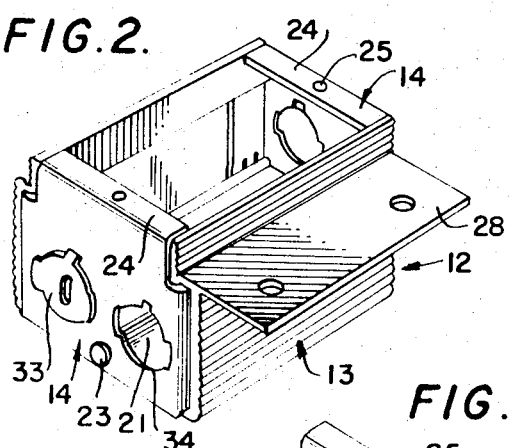
FIG. 2 is a perspective view of the box body and ends assembled.

Referring now to the accompanying drawings in detail, more particularly to FIGS. 1–6, the electrical outlet box designated generally by the numeral 12 in FIG. 2 consists of a box body 13 and a pair of box ends 14. The box body 13 is formed from extruded metal such as aluminum or aluminum alloy, a running length of the extrusion being shown at 13E in FIG. 1 in which it will be noted that the extrusion has open ends and an open top and includes a bottom wall 15 and a pair of side walls 16. These respectively constitute the bottom wall and side walls of the box body 13 when the extrusion is cut transversely as indicated at 17 in FIG. 1 to provide a box body of the desired length.

The extruded box body 13 is formed integrally at the inside of the side walls 16 with protrusions defining opposing channels 18, the purpose of which will be hereinafter explained. Incident to formation of these channels, the upper edge portions of the side walls 16 are inwardly stepped as at 16a, so that the open top of the box body is somewhat narrower than the bottom wall 15, as will be clearly apparent from the drawings.

Figure 5:
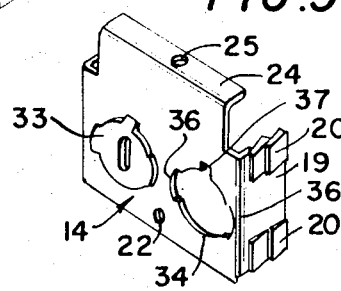
FIG. 5 is a perspective view of one of the box ends.
Figure 6:
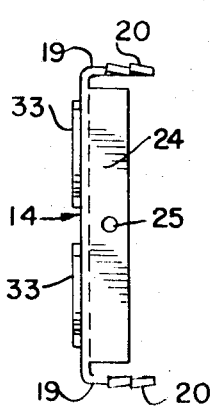
FIG. 6 is an edge view of the box end.

Each of the box ends 14, as shown in FIGS. 5 and 6, is provided at its opposite side edges with a pair of keeper members or flanges 19 which are inturned from the plane of the box end and are intended to be slidably inserted into the channels 18 at each end of the box body 13. Moreover, the keeper flanges 19 are deformed to provide integral wedge elements 20 thereon, and when the flanges 19 are inserted into the channels 18, the wedge elements 20 frictionally engage the side walls 16 of the box body so as to retain the box ends and the box body in assembled relation. Preferably, the box ends 14, including the flanges 19, are formed from metal such as steel, which is harder than the metal of the box body 13. Thus, when the flanges 19 are inserted into the channels 18, the hard wedge elements 20 bite into the relatively softer material of the box body side walls 16, and the box ends 14 are thereby positively prevented from separating from the box body.

Inasmuch as electrical codes in some locations require the parts of the box to be held together by screws, additional means are provided for holding the box body and ends assembled, these means involving the provision of a grooved rib 21 which is formed integrally on the inner surface of the bottom wall 15 and extends longitudinally thereon. The box ends 14 are apertured as at 22 (see FIG. 5) to receive screws 23 which are threaded into the groove of the rib 21 (see FIGS. 2 and 3), thus holding the box body and ends assembled in addition to the holding action which is provided by the flanges 19 and wedge elements 20 in the channels 18.

Figure 3:
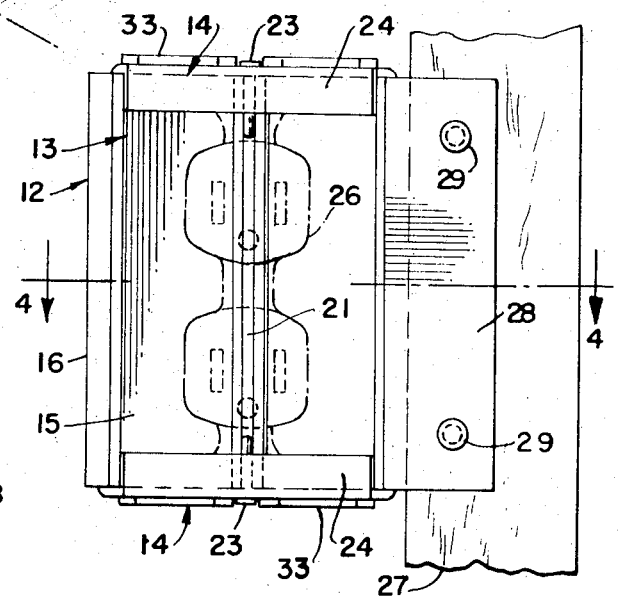
FIG. 3 is an enlarged elevational view of the assembled box mounted on a stud.

The box ends 14 are equipped at their upper edges with integral, inturned flanges 24, apertured as at 25, so that a switch, an outlet receptacle, or the like, may be installed in the assembled box as indicated by the dotted lines 26 in FIG. 3.

The assembled box 12 may be mounted at one side of a supporting stud 27, for which purpose one of the side walls 16 of the box body 13 is formed integrally with a laterally projecting mounting flange 28. This flange overlies the stud 27 and is apertured to receive fasteners such as nails 29, whereby to secure the entire box to the stud, as will be apparent from FIGS. 3 and 4. However, again in some locations, the electrical code requires the box to be additionally supported on the stud, as for example against inward pressure applied to the box by insertion of electrical plugs into the outlet receptacle 26. Thus, the bottom wall 15 of the box body 13 is formed integrally with an external, longitudinally extending rib 30 which is slanted in the direction of the stud 27 as seen in FIG. 4, so that a groove or channel 30' exists on the side of the rib facing the stud 27.

Figure 4:
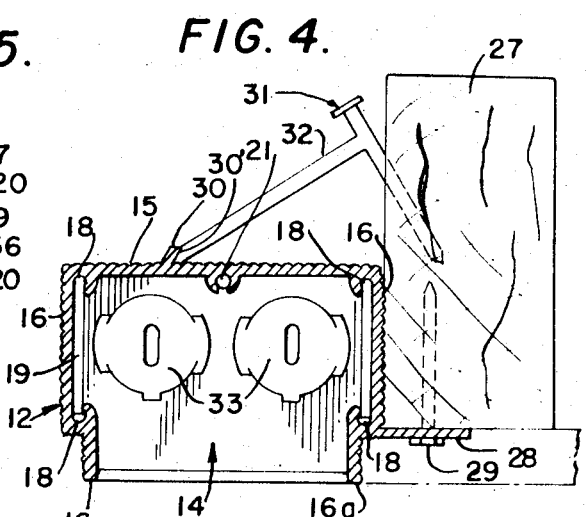
FIG. 4 is a sectional view, taken substantially in the plane of the line 4—4 in FIG. 3.

A special fastener 31 is provided, the same being substantially in the form of a nail which is driven at an angle into the side of the stud 27 as shown in FIG. 4 and has a laterally projecting leg 32 integral therewith. When the fastener 31 is driven partially into the stud as shown, the leg 32 extends diagonally with respect to the plane of the bottom wall 15 of the box and the free end of the leg 32 of the fastener is received and supportably engages the channel or groove 30' at the inside of the rib 30, whereby to reinforce the mounting of the box on the stud and resist any inward pressure to which the box may be subjected during use.

The box ends 14 are provided with knock-out plugs 33 which, when removed, result in formation of irregularly shaped openings 34 in the box ends, for reception of cable connectors, one of which is shown in FIGS. 7-9, and designated generally by the numeral 35. The invention also involves a particular shape of the openings 34 and a particular structure of the connectors 35, coacting to facilitate quick application of the connectors to the box ends by simply inserting the connectors in the openings and rotating or turning the same through 90°, as will be presently explained.

Each of the knock-out plugs 33 is shaped so that when it is removed it leaves a substantially circular yet irregular opening 34, the edge of the opening having a pair of diametrically opposed, arcuate recesses 36 and a sharp notch 37 at one side of the opening between the recesses, as will be apparent from FIG. 5. The notch 37 has sharp corners 37' at its junction with the edge of the opening 34 (see FIG. 11). The connector 35 for most part is of a conventional type, having a portion 38 in which an electrical cable may be secured by conventional means, as by a screw (not shown) threaded into a lateral boss 39, as is customary in the art. The connector is also provided with an annular shoulder 40 which abuts the outer surface of the box end 14 when the connector is inserted in the opening 34. However, in accordance with the invention, the portion 41 of the connector which is inserted into the opening 34 is provided with a pair of diametrically opposite lugs 42, and portions of the connector, indicated at 43, between the shoulder 40 and the lugs 42 are raised so as to exceed the diameter of the opening 34, as will be apparent from FIG. 11.

As already stated, the box end 14 is formed from relatively hard metal such as steel, for example, while the connectors 35 are formed from softer metal such as zinc, for example, although other metal may be used for the connectors, as long as it is softer than the metal of the box end.

When a connector 35 is to be applied to the assembled box, one of the knock-out plugs 33 is removed to provide the opening 34 in the box end 14. The portion 41 of the connector is inserted in the opening, with the lugs 42 passing freely through the recesses 36 in the opening, until the lugs are disposed at the inside of the box end. A suitable spanner wrench, indicated at 44 in FIG. 10, is then applied to the outer portion 38 of the connector and the connector is rotated or turned by the wrench through approximately 90° as indicated by the arrow 45. This brings the lugs 42 out of alignment with the recesses 36 so that the lugs abuttingly engage the inner surface of the box end while the outer surface of the box end is abutted by the shoulder 40. Thus, the connector is prevented from moving axially in both directions. At the same time, the partial rotation of the connector brings the raised portions 43 into a wedging, compressive engagement with the edge of the opening 34 between the recesses 36, thus producing a frictional wedging effect which prevents rotation of the connector in the opposite direction and thus serves to firmly retain the connector in the opening. This wedging effect is further enhanced by the fact that the sharp corners 37' of the notch 37 bite into the raised connector portions 43 while the same are being wedgingly compressed against the edge of the opening 34, so that retrograde rotation of the connector in the opening is virtually impossible under in-service conditions of the outlet box.

The inner end of the inner end portion 41 of the connector 35 is provided with an integral open work abutment comprising a ring 47 of smaller outside diameter than the inside diameter of the inner end portion and plural radial spokes 48 connecting the ring to the inner end portion 41. In accordance with conventional practice and many building codes a bushing (not shown) of insulating material is positioned within the inner end portion 41 against the open work abutment 47. A building inspector looking inside the electrical outlet box may readily determine by visual inspection through the open work abutment whether the required bushing is in place.

In order to facilitate the insertion of the connector 35 in a knock-out opening 34, the inner edges of the arcuate lugs 42 are beveled to provide radially inwardly sloping surfaces 42' which function to guide the connector into proper alignment within the knock-out opening for easy insertion.

At least one longitudinally extending rib 49 is integrally formed on the outside surface of the outer end portion 38 of the connector 35. The rib 49 provides an abutment for the spanner wrench 44 whereby the connector may be rotated to its fastened position.

In keeping with conventional practice, the outer surfaces of the bottom wall 15 and side walls 16 of the extrusion 13E may be longitudinally ribbed as indicated in FIGS. 1 and 4, which enchances the appearance of the extruded box body, as distinguished from plain surfaces of boxes made by stamping, or the like.

While in the foregoing there has been described and shown the preferred embodiment of the invention, various modifications and equivalents may be resorted to within the spirit and scope of the invention as claimed.

What is claimed as new is:

1. An electrical outlet box comprising a box body having an open top and open ends and including a bottom wall and a pair of side walls, opposing channels formed integrally at the inside of said side walls, a pair of box ends separate from said box body and closing said open ends of the body, and inturned keeper members provided at opposite side edges of said box ends, said keeper members being inserted and frictionally retained in said channels whereby to hold the box body and box ends in assembled relation.

2. The device as defined in claim 1 together with wedge elements formed integrally on said keeper members and frictionally engaging said side walls when the keeper members are inserted in said channels.

3. The device as defined in claim 2 which is further characterized in that said box body and said box ends are formed from metal, the metal of the body being softer than that of the ends whereby to facilitate biting of said wedge elements into the side walls of the body.

4. The device as defined in claim 1 together with additional means for retaining said box body and ends in assembled relation, said additional retaining means comprising a grooved rib formed integrally with and extending longitudinally on the bottom wall of the body, and screw-threaded fasteners extending through the box ends into the groove of said rib.

5. The device as defined in claim 1 together with a laterally projecting box mounting flange formed integrally with and extending longitudinally on the outer surface of one of said side walls, said flange being apertured to receive fasteners for securing the box to supporting structure.

6. The device as defined in claim 1 together with a keeper rib formed integrally with and extending longitudinally on the outer surface of said bottom wall of the box body, said rib being adapted to be supportably engaged by a special fastener applied to a supporting structure for the box.

7. The outlet box set forth in claim 1 wherein at least one of said box ends is provided with a substantially circular opening and with diametrically opposed arcuate recesses in the edge of said opening for receiving a cable connector in interlocking engagement with said box and surrounding said opening and a knock-out plug integrally connected to said box end and closing said opening.

8. The outlet box set forth in claim 7 wherein a sharp notch is provided in the edge of said opening at a point between said recesses.

9. The combination of an electrical outlet box, a supporting stud therefor, said box including a bottom wall and a pair of side walls, one of the side walls being juxtaposed to said stud, a laterally projecting mounting flange formed integrally with said one side wall and overlying the stud, fasteners extending through said flange into the stud, a keeper rib formed integrally on the outer surface of said bottom wall, and a special fastener driven into the side of the stud, said fastener including an integral laterally projecting leg which supportably engages said keeper rib.

10. The combination as defined in claim 9 wherein said leg of said special fastener extends diagonally with respect to the plane of said bottom wall, said keeper rib being laterally slanted to form a channel at one side of the rib in which the end of said leg is received.

11. The combination of an electrical outlet box having a wall provided with a substantially circular opening and with diametrically opposed arcuate recesses in the edge of said opening, a cable connector rotatably received in said opening, an annular shoulder provided on said connector for abutting the outer surface of the box wall, and a pair of arcuate lugs provided at diametrically opposite sides of the connector for passage through said recesses when the connector is inserted in the opening, the connector being rotatable in the opening to a fastened position wherein said lugs abut the inner surface of the box wall to retain the connector and box in assembled relation, portions of said connector between said shoulder and said lugs being raised to exceed the diameter of said opening in the box wall, said raised portions becoming wedged against the edge of the opening when the connector is rotated to its fastened position.

12. The combination as defined in claim 11 which is further characterized in that said box wall and said connector are made of metal, the metal of the connector being softer than that of the box wall whereby to facilitate wedging of the raised portions of the connector against the edge of said opening.

13. The combination as defined in claim 12 in which a sharp notch is provided in the edge of said opening at a point between said recesses, said notch having sharp corners biting into the raised portions of said connector when the latter is rotated to its fastened position, whereby to prevent rotation of the connector in the opposite direction.

14. The combination set forth in claim 11 wherein said connector is tubular and includes an inner end portion which extends inside said box and an outer end portion which projects outside said box when said connector is fastened in assembled relationship with said box.

15. The combination set forth in claim 14 wherein there is at least one longitudinally extending rib integrally formed on the outside surface of said outer end portion which provides an abutment for a spanner wrench whereby said connector may be rotated to its fastened position.

16. The combination set forth in claim 14 wherein said outer end portion is open ended for receiving a cable and is provided with a lateral boss through which a screw may be threaded to wedge said cable against the inside surface of said tubular connector.

17. The combination set forth in claim 11 wherein said arcuate lugs are provided on the outer surface of said inner end portion, said lugs being beveled along their inner edge to provide a cam surface to facilitate insertion of said connector in said knock-out opening.

18. An electrical outlet box including a bottom wall and a pair of side walls, a laterally projecting mounting flange extending from one of said side walls, and a keeper rib formed integrally on the outer surface of said bottom wall, said rib being laterally slanted to form a channel at one side of the rib in which the leg of a special fastener may be engaged for diagonally bracing said back wall with respect to a support juxtaposed against one side wall of said outlet box.

* * * * *